US010542017B1

(12) United States Patent
Gates et al.

(10) Patent No.: US 10,542,017 B1
(45) Date of Patent: Jan. 21, 2020

(54) SYSTEMS AND METHODS FOR PERSONALIZING SECURITY INCIDENT REPORTS

(71) Applicant: Symantec Corporation, Mountain View, CA (US)

(72) Inventors: Chris Gates, Culver City, CA (US); Michael Hart, Culver City, CA (US); Kevin Roundy, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 613 days.

(21) Appl. No.: 15/292,874

(22) Filed: Oct. 13, 2016

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1433* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,675,711 A * | 10/1997 | Kephart | G06F 21/564 706/12 |
| 5,749,066 A * | 5/1998 | Nussbaum | G10L 15/063 704/232 |
| 7,352,280 B1 | 4/2008 | Rockwood | |
| 8,214,905 B1 | 7/2012 | Doukhvalov et al. | |
| 8,468,244 B2 * | 6/2013 | Redlich | G06Q 10/06 709/225 |
| 8,839,435 B1 | 9/2014 | King | |
| 9,098,706 B1 | 8/2015 | Kennedy | |
| 9,270,467 B1 | 2/2016 | Chen et al. | |
| 9,336,385 B1 * | 5/2016 | Spencer | H04L 63/1441 |
| 9,413,780 B1 | 8/2016 | Kaplan et al. | |

(Continued)

OTHER PUBLICATIONS

Kevin Alejandro Roundy, et al; Systems and Methods for Detecting Security Threats; U.S. Appl. No. 15/084,522, filed Mar. 30, 2016.

(Continued)

*Primary Examiner* — Maung T Lwin
*Assistant Examiner* — Olanrewaju J. Bucknor
(74) *Attorney, Agent, or Firm* — FisherBroyles, LLP

(57) ABSTRACT

The disclosed computer-implemented method for personalizing security incident reports may include (i) generating, within a training dataset, a feature vector for each of a group of security incidents, the feature vector including features that describe the security incidents and the features including response codes that a set of clients previously assigned to the security incidents as labels, (ii) training a supervised machine learning function on the training dataset using the response codes that the set of clients previously assigned to the security incidents, (iii) applying the supervised machine learning function to a feature vector that describes a new security incident on the set of clients to predict that the set of clients will ignore the new security incident, and (iv) personalizing a list of security incidents that is electronically reported to the set of clients by deprioritizing the new security incident. Other methods, systems, and computer-readable media are also disclosed.

20 Claims, 7 Drawing Sheets

(56) References Cited

U.S. PATENT DOCUMENTS

| | | | |
|---|---|---|---|
| 9,485,272 | B1 | 11/2016 | Roundy |
| 9,792,169 | B2 | 10/2017 | Seigel |
| 9,838,405 | B1 | 12/2017 | Guo et al. |
| 9,888,024 | B2* | 2/2018 | Roundy ............... G06F 21/552 |
| 9,985,982 | B1* | 5/2018 | Bartos ............... H04L 63/1425 |
| 10,069,849 | B2* | 9/2018 | Muddu ............... G06F 16/254 |
| 2002/0083070 | A1 | 6/2002 | Shuster |
| 2002/0103811 | A1* | 8/2002 | Fankhauser ........... G16H 40/20 |
| 2005/0283837 | A1 | 12/2005 | Olivier et al. |
| 2006/0095521 | A1* | 5/2006 | Patinkin ............... G06Q 10/107 |
| | | | 709/206 |
| 2006/0230451 | A1 | 10/2006 | Kramer et al. |
| 2006/0242712 | A1 | 10/2006 | Linn et al. |
| 2006/0253548 | A1 | 11/2006 | Vitanov et al. |
| 2007/0240217 | A1 | 10/2007 | Tuvell et al. |
| 2008/0016208 | A1* | 1/2008 | Treinen ............... H04L 63/1416 |
| | | | 709/224 |
| 2008/0086772 | A1 | 4/2008 | Chesla |
| 2009/0089290 | A1 | 4/2009 | Nachenberg et al. |
| 2009/0217370 | A1 | 8/2009 | Hulten et al. |
| 2010/0083376 | A1 | 4/2010 | Pereira et al. |
| 2010/0228852 | A1 | 9/2010 | Gemelos et al. |
| 2011/0255784 | A1* | 10/2011 | Welling ............. G06K 9/00442 |
| | | | 382/182 |
| 2011/0255790 | A1* | 10/2011 | Duggan ............. G06K 9/00442 |
| | | | 382/190 |
| 2011/0267964 | A1* | 11/2011 | Baltatu .................. H04L 43/00 |
| | | | 370/242 |
| 2012/0233698 | A1 | 9/2012 | Watters et al. |
| 2013/0074143 | A1 | 3/2013 | Bu et al. |
| 2014/0096246 | A1 | 4/2014 | Morrissey et al. |
| 2014/0223566 | A1 | 8/2014 | Zaitsev |
| 2014/0283066 | A1 | 9/2014 | Teddy et al. |
| 2015/0047032 | A1* | 2/2015 | Hannis ............... H04L 63/1416 |
| | | | 726/23 |
| 2015/0074806 | A1 | 3/2015 | Roundy et al. |
| 2015/0128263 | A1 | 5/2015 | Raugas et al. |
| 2015/0207813 | A1* | 7/2015 | Reybok ................. H04L 63/145 |
| | | | 726/22 |
| 2015/0261954 | A1* | 9/2015 | Xue ...................... G06F 21/554 |
| | | | 726/23 |
| 2015/0372976 | A1 | 12/2015 | Lonas et al. |
| 2016/0072836 | A1 | 3/2016 | Hadden et al. |
| 2016/0080400 | A1 | 3/2016 | Sim et al. |
| 2016/0162693 | A1* | 6/2016 | Breuer .................. G06F 21/602 |
| | | | 713/164 |
| 2016/0292419 | A1 | 10/2016 | Langton et al. |
| 2016/0330219 | A1* | 11/2016 | Hasan ................. H04L 63/1408 |
| 2017/0091617 | A1* | 3/2017 | Baughman ........... G06N 3/0472 |
| 2017/0249644 | A1* | 8/2017 | DiMaggio ............. G06Q 30/018 |
| 2017/0339168 | A1* | 11/2017 | Balabine ............... G06F 16/951 |
| 2017/0353477 | A1* | 12/2017 | Faigon ................ H04L 63/1416 |

OTHER PUBLICATIONS

ArcSight; http://www8.hp.com/us/en/software-solutions/arcsight-express-siem-appliance/tech-specs.html?jumpid=reg_r1002_usen_c-001_title_r0002, as accessed Apr. 25, 2014; Hewlett-Packard Development Company, L.P., 2014.

Association rule learning; https://en.wikipedia.org/wiki/Association_rule_learning, as accessed Mar. 2, 2016; Wikipedia.

Fanglu Guo, et al; Systems and Methods for Determining Types of Malware Infections on Computing Devices; U.S. Appl. No. 14/947,878, filed Nov. 20, 2015.

Kevin Alejandro Roundy; Systems and Methods for Estimating Confidence Scores of Unverified Signatures; U.S. Appl. No. 14/307,477, filed Jun. 18, 2014.

Kevin Roundy, et al; Systems and Methods for Determining the Trustworthiness of Files Within Organizations; U.S. Appl. No. 14/753,051, filed Jun. 29, 2015.

Kevin Roundy, et al; Systems and Methods for Identifying Non-Malicious Files on Computing Devices Within Organizations; U.S. Appl. No. 14/750,342, filed Jun. 25, 2015.

Yu; Alert Confidence Fusion in Intrusion Detection Systems with Extended Dempster-Shafer Theory; http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014; 43rd ACM Southeast Conference, Kennesaw, GA, USA, (Mar. 18-20, 2005).

Liwei (Vivian) Kuang; DNIDS: A Dependable Network Intrusion Detection System Using the CSI-KNN Algorithm; https://qspace.library.queensu.ca/bitstream/1974/671/2/Kuang_Liwei_200709_MSc.pdf, as accessed Apr. 25, 2014; A thesis submitted to the School of Computing in conformity with the requirements for the degree of Master of Science, Queen's University, Kingston, Ontario, Canada; Sep. 7, 2016.

Nate Lord; Common Malware Types: Cybersecurity 101; https://www.veracode.com/blog/2012/10/common-malware-types-cybersecurity-101, as accessed Sep. 21, 2015; VERACODE; Oct. 12, 2012.

Managed Security Services; http://www.symantec.com/managed-security-services/, as accessed Sep. 21, 2015; Symantec Corporation; on or before Sep. 21, 2015.

Naive Bayes classifier; https://en.wikipedia.org/wiki/Naive_Bayes_classifier, as accessed Sep. 21, 2015; Wikipedia; Jan. 31, 2005.

Probabilistic classification; https://en.wikipedia.org/wiki/Probabilistic_classification, as accessed Sep. 21, 2015; Wikipedia; Aug. 7, 2014.

Stack Overflow; http://stackoverflow.com/, as accessed May 13, 2015; Stack Exchange Inc; Mar. 1, 2000.

Yelp; http://www.yelp.com/, as accessed May 13, 2015; Nov. 28, 1996.

Chris Gates, et al; Systems and Methods for Detecting Security Blind Spots; U.S. Appl. No. 15/266,320, filed Sep. 15, 2016.

Kevin Alejandro Roundy, et al; Systems and Methods for Detecting Security Threats; U.S. Appl. No. 15/084,522, filed 30 Mar. 30, 2016.

Association rule learning; https://en.wikipedia.org/wiki/Association_rule_learning, as accessed Mar. 2, 2016; Wikipedia; Apr. 15, 2005.

Kuang, Liwei (Vivian); DNIDS: A Dependable Network Intrusion Detection System Using the CSI-KNN Algorithm; https://qspace.library.queensu.ca/bitstream/1974/671/2/Kuang_Liwei_200709_MSc.pdf, as accessed Apr. 25, 2014; A thesis submitted to the School of Computing in conformity with the requirements for the degree of Master of Science, Queen's University, Kingston, Ontario, Canada; Sep. 2007.

Lord, Nate; Common Malware Types: Cybersecurity 101; https://www.veracode.com/blog/2012/10/common-malware-types-cybersecurity-101, as accessed Sep. 21, 2015; VERACODE; Oct. 12, 2012.

Managed Security Services; http://www.symantec.com/managed-security-services/,as accessed Sep. 21, 20:15; Symantec Corporation; published on or before Sep. 21, 2015.

Naive Bayes classifier; https://en.wikipefila.org/wiki/Naive_Bayes_classifier, as accessed Sep. 21, 2015; Wikipedia; Jan. 31, 2005.

Yu, Dong et al.; Alert Confidence Fusion in Intrusion Detection Systems with Extended Dempster-Shafer Theory; http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014; 43rd ACM Southeast Conference, Kennesaw, GA, USA; Mar. 18-20, 2005.

Suleiman Yerima et al., A New Android Malware Detection Approach Using Bayesian Classification, IEEE, 2013.

\* cited by examiner

SYSTEMS AND METHODS FOR PERSONALIZING SECURITY INCIDENT REPORTS

BACKGROUND

Individuals and organizations typically seek to protect their computing resources from attackers and malicious threats. In some examples, enterprise organizations may hire a computing security vendor to provide security services to protect corresponding computing resources. More specifically, some security vendors may deploy a variety of endpoint security products on client machines of associated customers. The endpoint security products may detect the triggering of signature matches on the client machines that indicate the potential presence of a security threat, such as an intrusion or infection. The security vendors may collect information about the signature matches on one or more backend security servers. Moreover, the security vendors may process and analyze the collected information to prepare one or more reports about potential security threats on the client machines, thereby helping to protect the customers from corresponding security threats. Accordingly, in some examples, security vendors may leverage insights gained from one customer to help protect another customer.

Nevertheless, a computing security vendor that maintains a sufficiently large database of information about detected signature matches, and/or that provides security services for a sufficiently large number of customers, may encounter situations where the number of potential security threats becomes difficult to manage. The instant disclosure, therefore, identifies and addresses a need for systems and methods for personalizing security incident reports.

SUMMARY

As will be described in greater detail below, the instant disclosure describes various systems and methods for personalizing security incident reports. In one example, a computer-implemented method for personalizing security incident reports may include (i) generating, within a training dataset, a feature vector for each of a group of security incidents, the feature vector including features that describe the security incidents and the features including response codes that a set of clients previously assigned to the security incidents as labels, (ii) training a supervised machine learning function on the training dataset using the response codes that the set of clients previously assigned to the security incidents such that the supervised machine learning function learns how to predict an assignment of future response codes to future security incidents, (iii) applying the supervised machine learning function to a feature vector that describes a new security incident on the set of clients to predict that the set of clients will ignore the new security incident, and (iv) personalizing a list of security incidents that is electronically reported to the set of clients by deprioritizing the new security incident based on applying the supervised machine learning function to the feature vector that describes the new security incident.

In one embodiment, the feature vector for each of the security incidents specifies at least two of: (i) a company where the respective security incident occurred, (ii) at least one signature detection that triggered in correspondence to the respective security incident, and (iii) a severity code for the respective security incident. In further embodiments, the feature vector for each of the security incidents specifies at least one of timing information indicating a timing of the respective security incident and at least one of source and destination information for a corresponding security threat.

In one embodiment, the response codes that the set of clients previously assigned to the security incidents as labels specify at least two of: (i) no action, (ii) resolved, (iii) false positive, (iv) defer, and (v) untouched. In one embodiment, the response codes were previously assigned to the security incidents within the training dataset by one client within the set of clients and the new security incident occurred on a different client within the set of clients and the list of security incidents is electronically reported to the different client. In further embodiments, the response codes were previously assigned to the security incidents within the training dataset by one client within the set of clients and the new security incident occurred on the same client within the set of clients and the personalized list of security incidents is electronically reported to the same client. In some examples, deprioritizing the new security incident may include omitting the new security incident from the list of security incidents that is electronically reported to the set of clients.

In some examples, training a supervised machine learning function on the training dataset using the response codes that the set of clients previously assigned to the security incidents may include performing a grid search to ascertain numerical weights that minimize false negatives. In further examples, training a supervised machine learning function on the training dataset using the response codes that the set of clients previously assigned to the security incidents may include performing a stochastic gradient descent. In further embodiments, the method may additionally include automatically performing a security action to protect the set of clients based on applying the supervised machine learning function to the feature vector that describes the new security incident.

In one embodiment, a system for implementing the above-described method may include (i) a generation module, stored in memory, that generates, within a training dataset, a feature vector for each of a group of security incidents, the feature vector including features that describe the security incidents and the features including response codes that a set of clients previously assigned to the security incidents as labels, (ii) a training module, stored in memory, that trains a supervised machine learning function on the training dataset using the response codes that the set of clients previously assigned to the security incidents such that the supervised machine learning function learns how to predict an assignment of future response codes to future security incidents, (iii) an application module, stored in memory, that applies the supervised machine learning function to a feature vector that describes a new security incident on the set of clients to predict that the set of clients will ignore the new security incident, (iv) a personalizing module, stored in memory, that personalizes a list of security incidents that is electronically reported to the set of clients by deprioritizing the new security incident based on applying the supervised machine learning function to the feature vector that describes the new security incident, and (v) at least one physical processor configured to execute the generation module, the training module, the application module, and the personalizing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) generate, within a training dataset, a feature vector for each of a group of security incidents, the feature vector including features that describe the security incidents and the features including response codes that a set of clients previously assigned to the security incidents as labels, (ii) train a supervised machine learning function on the training dataset using the response codes that the set of clients previously assigned to the security incidents such that the supervised machine learning function learns how to predict an assignment of future response codes to future security incidents, (iii) apply the supervised machine learning function to a feature vector that describes a new security incident on the set of clients to predict that the set of clients will ignore the new security incident, and (iv) personalize a list of security incidents that is electronically reported to the set of clients by deprioritizing the new security incident based on applying the supervised machine learning function to the feature vector that describes the new security incident.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
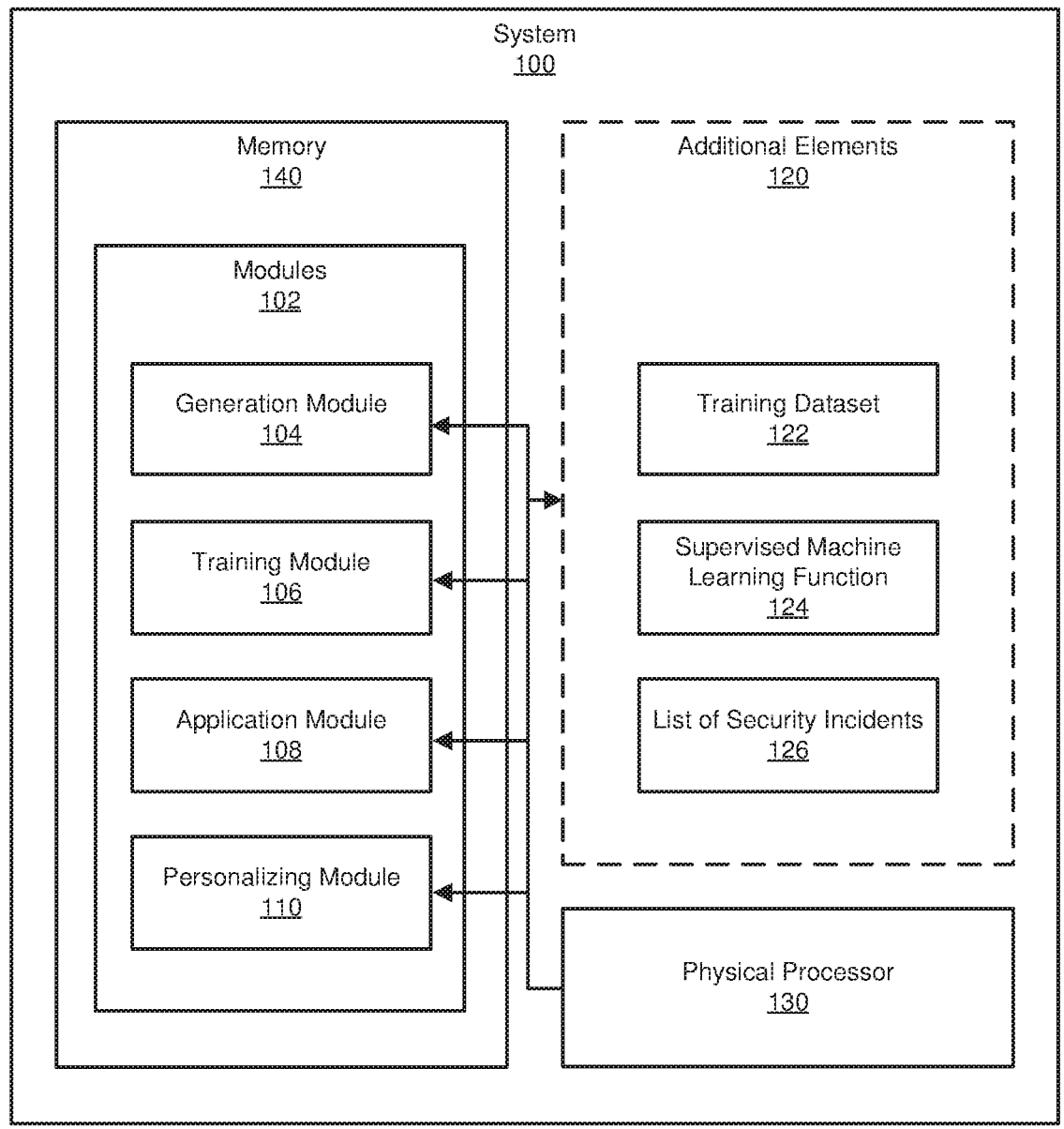
FIG. 1 is a block diagram of an example system for personalizing security incident reports.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for personalizing security incident reports. As will be discussed further below, the disclosed systems and methods may render reports of security incidents more manageable. For example, the disclosed systems and methods may reduce a number of security incidents within a report so that a customer finds the report easier to reference and apply. In some examples, the disclosed systems and methods may reduce the number of security incidents by an order of magnitude. In additional or alternative examples, the disclosed systems and methods may simply decrease a priority of one or more security incidents, without fully omitting the security incidents from the report. In these examples, the disclosed systems and methods may use machine learning to predict how a customer will respond to a security incident and, if a corresponding prediction indicates that the customer will effectively ignore the security incident, then the disclosed systems and methods may decrease the priority for that security incident. Additionally, the machine learning function may be configured to strictly avoid false negatives while allowing some false positives, thereby preventing situations where the security report omits a security incident that a customer should address because the security incident is high-priority or indicates a security threat with high confidence, as discussed further below.

Figure 2:
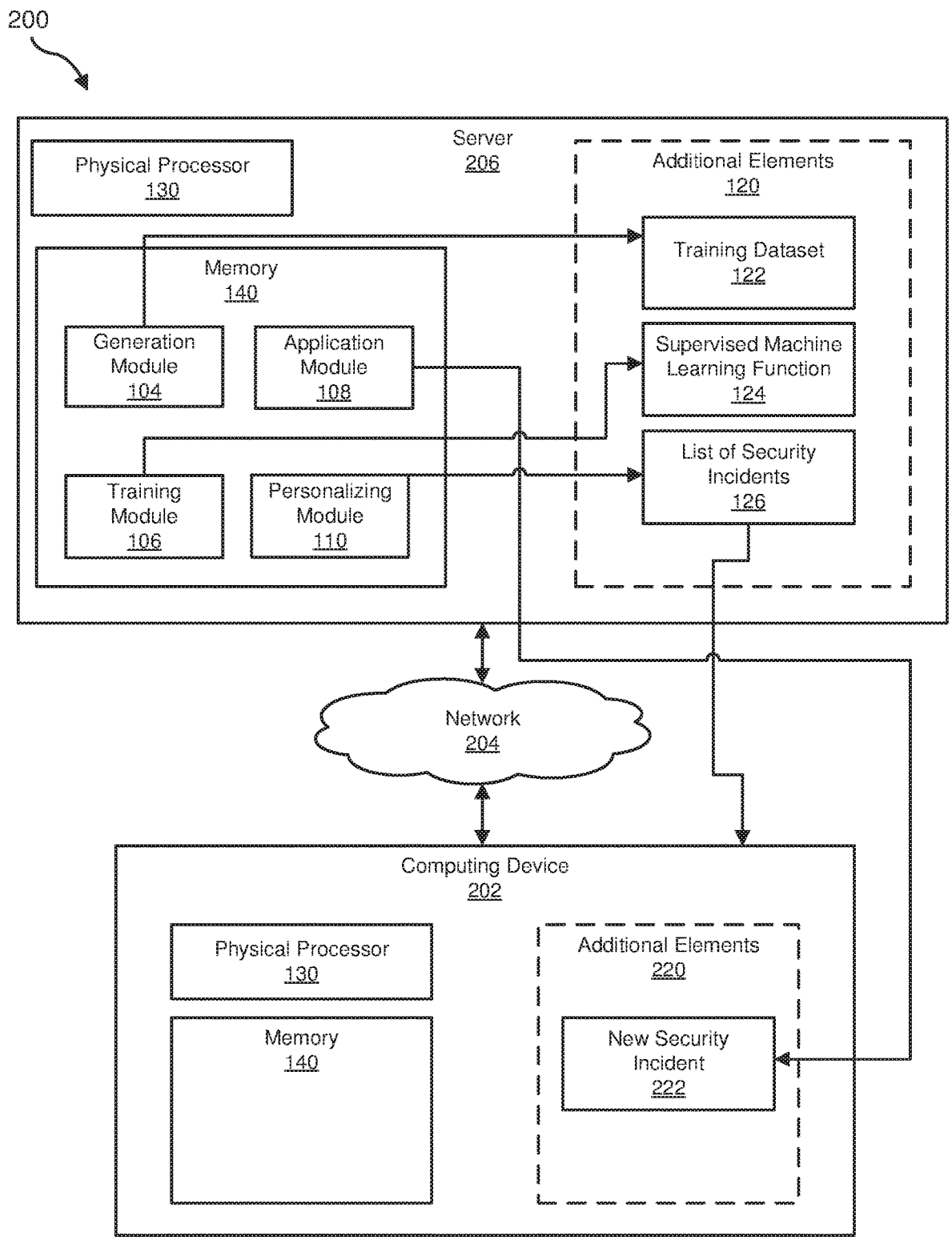
FIG. 2 is a block diagram of an additional example system for personalizing security incident reports.

The following will provide, with reference to FIGS. 1-2, detailed descriptions of example systems for personalizing security incident reports. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for personalizing security incident reports. As illustrated in this figure, example system 100 may include one or more modules 102 for performing one or more tasks. For example, and as will be explained in greater detail below, example system 100 may include a generation module 104 that generates, within a training dataset, a feature vector for each of a group of security incidents. The feature vector may include features that describe the security incidents and the features may include response codes that a set of clients previously assigned to the security incidents as labels. Example system 100 may additionally include a training module 106 that trains a supervised machine learning function on the training dataset using the response codes that the set of clients previously assigned to the security incidents such that the supervised machine learning function learns how to predict an assignment of future response codes to future security incidents. Example system 100 may also include an application module 108 that applies the supervised machine learning function to a feature vector that describes a new security incident on the set of clients to predict that the set of clients will ignore the new security incident. Example system 100 may additionally include a personalizing module 110 that personalizes a list of security incidents that is electronically reported to the set of clients by deprioritizing the new security incident based on applying the supervised machine learning function to the feature vector that describes the new security incident. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate personalizing security incident reports. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as a training dataset 122, which may include information about detected security events at corresponding clients, as first discussed above. Additionally, additional elements 120 may also include a supervised machine learning function 124, which may be trained on training dataset 122. Furthermore, additional elements 120 may also include a list of security incidents 126, which may be personalized based on the results of applying supervised machine learning function 124 to a feature vector that describes a new security incident, as discussed further below. Additional elements 120 generally represent data structures that may be stored within any type or form of relational database or other database.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to personalize security incident reports. For example, and as will be described in greater detail below, generation module 104 may generate, within training dataset 122, a feature vector for each of a group of security incidents. The feature vector may include features that describe the security incidents and the features may include response codes that a set of clients previously assigned to the security incidents as labels. In this example, computing device 202 may correspond to a computing device within the set of clients (e.g., a client machine of a customer of a security vendor, as discussed further below). Similarly, server 206 may correspond to a backend server of a security vendor. Training module 106 may train supervised machine learning function 124 on training dataset 122 using the response codes that the set of clients previously assigned to the security incidents such that the supervised machine learning function learns how to predict an assignment of future response codes to future security incidents. Application module 108 may apply supervised machine learning function 124 to a feature vector that describes a new security incident 222, within additional elements 220, on computing device 202 to predict that the set of clients will ignore new security incident 222. Personalizing module 110 may personalize list of security incidents 126 that is electronically reported to the set of clients by deprioritizing new security incident 222 based on applying supervised machine learning function 124 to new security incident 222.

Computing device 202 generally represents any type or form of computing device capable of reading computer-executable instructions. In one example, computing device 202 may correspond to a client machine that is monitored or protected by the services of a security vendor and thereby provides information about security threat detections to server 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of facilitating the personalization of security incident reports, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
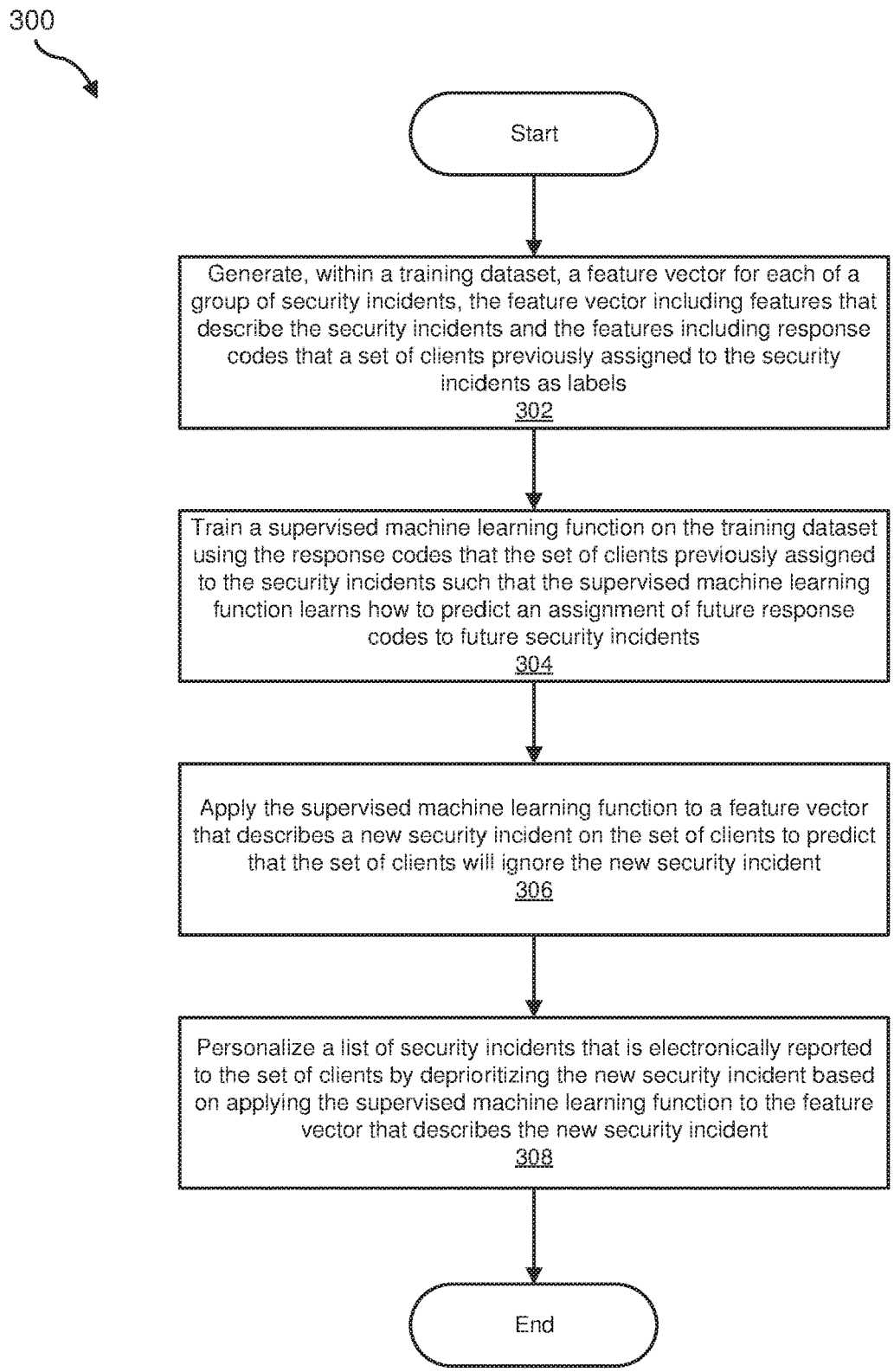
FIG. 3 is a flow diagram of an example method for personalizing security incident reports.

FIG. 3 is a flow diagram of an example computer-implemented method 300 for personalizing security incident reports. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may generate, within a training dataset, a feature vector for each of a group of security incidents, the feature vector including features that describe the security incidents and the features including response codes that a set of clients previously assigned to the security incidents as labels. For example, generation module 104 may, as part of server 206, generate, within training dataset 122, a feature vector for each of a group of security incidents, which may be associated with list of security incidents 126.

As used herein, the term "feature vector" generally refers to a data structure, stored within computing memory, that includes at least two fields that specify corresponding values. Similarly, as used herein, the term "group of security incidents" generally refers to one or more security incidents. Additionally, as used herein, the term "security incident" generally refers to a data structure, stored within computing memory, that describes, or corresponds to, a detection of a candidate security threat at a client machine. In general, the feature vector may include a response code that indicates how a client responded to detection of the candidate security threat, as discussed further below. Furthermore, the term "set of clients" generally refers to one or more clients. Lastly, the term "client" generally refers to client machines (e.g., hardware, software, network, and/or virtual machines), and/or users or administrators of those machines, which may specify response codes in response to detection of a candidate security threat, as discussed further below (e.g., by manually toggling the label for the response code and/or by taking an action that an endpoint security program interprets as corresponding to one of the response codes and, therefore, automatically toggles).

Generation module 104 may generate the feature vector in a variety of ways. In general, generation module 104 may create a new instance of the data structure that is configured for storing values that describe attributes of a corresponding candidate security threat. Generation module 104 may also populate the new instance of the data structure with the values that describe the attributes of the corresponding candidate security threat. In one embodiment, the feature vector for each of the security incidents specifies one or more of: (i) a company where the respective security incident occurred, (ii) at least one signature detection that triggered in correspondence to the respective security incident, and (iii) a severity code for the respective security incident. Additionally, or alternatively, the feature vector for each of the security incidents specifies timing information indicating a timing of the respective security incident and/or at least one of source and destination information for a corresponding security threat.

Figure 4:
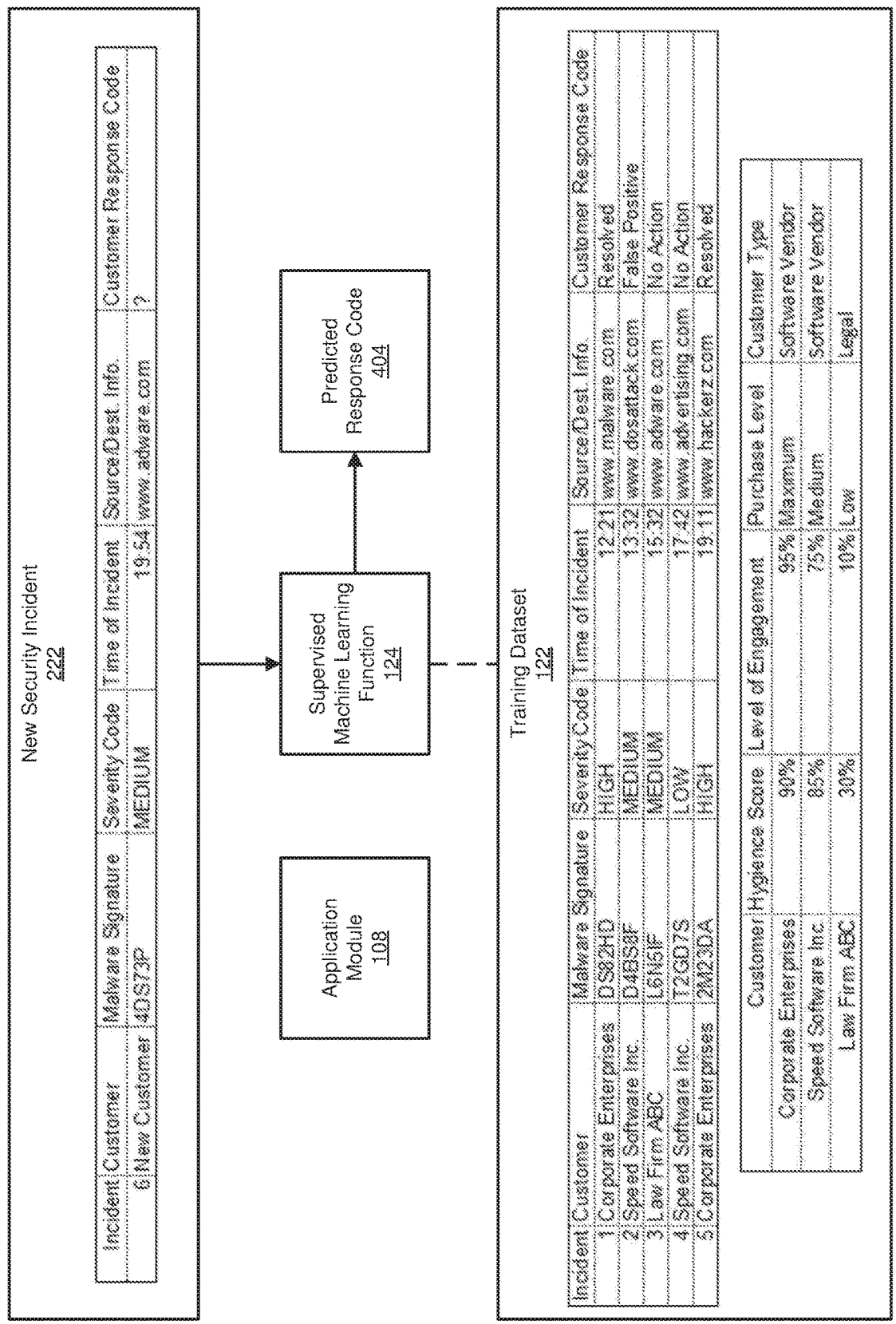
FIG. 4 is a block diagram of an example training dataset.

FIG. 4 illustrates example training dataset 122, including five corresponding security incidents. Training dataset 122 stores a feature vector (e.g., a row in this figure) for each of the security incidents. As shown in this figure, the first security incident corresponds to the customer "Corporate Enterprises," the malware signature "DS82HD," the severity code "HIGH," the time of incident "12:21," the source/destination information "www.malware.com," and the customer response code "resolved." Training dataset 122 specifies parallel information for the other security incidents.

In one embodiment, the response codes that the set of clients previously assigned to the security incidents as labels specify any permutation of: (i) no action, (ii) resolved, (iii) false positive, (iv) defer, and/or (v) untouched. "No action" may indicate that the customer has not taken action to resolve the security incident even if the customer has accessed, reviewed, and/or manipulated the corresponding security incident. "Resolved" may indicate that the customer has taken action to resolve the corresponding security incident (e.g., in a manner that neutralizes the security incident). "False positive" may indicate that the customer has reviewed the corresponding security incident and indicated that it constitutes a false alarm in the sense that there is no real or genuine threat to security. "Defer" may indicate that the customer has reviewed the security incident and intends to resolve or address the security incident at a later time. "Untouched" may indicate that the customer has not even accessed, viewed, reviewed, and/or manipulated the corresponding security incident yet.

At step 304, one or more of the systems described herein may train a supervised machine learning function on the training dataset using the response codes that the set of clients previously assigned to the security incidents such that the supervised machine learning function learns how to predict an assignment of future response codes to future security incidents. For example, training module 106 may, as part of server 206 in FIG. 2, train supervised machine learning function 124 on training dataset 122 using the response codes that the set of clients previously assigned to the security incidents such that supervised machine learning function 124 learns how to predict an assignment of future response codes to future security incidents.

As used herein, the term "supervised machine learning function" generally refers to a function, based on machine learning, that is configured for training on a corresponding dataset, such as training dataset 122. The machine learning function may be supervised in the sense that the data within training dataset 122 is labeled (e.g., in this case the customer response code may constitute the label) such that the machine learning function learns to predict the label for new, incoming, unlabeled feature vectors, such as new security incident 222, which is further shown in FIG. 4. Training module 106 may train the supervised machine learning function using any suitable machine learning system, software, and/or algorithm. In some examples, training module 106 may analyze training dataset 122 to detect patterns and then adjust or revise one or more numerical weights within the supervised machine learning function based on the detected patterns.

In some examples, training module 106 may train the supervised machine learning function on the training dataset using the response codes that the set of clients previously assigned to the security incidents by performing a grid search to ascertain numerical weights that minimize false negatives. In further examples, training module 106 may train the supervised machine learning function on the training dataset using the response codes that the set of clients previously assigned to the security incidents by performing a stochastic gradient descent. Additionally, or alternatively, training module 106 may train the supervised machine learning function on the training dataset using the response codes that the set of clients previously assigned to the security incidents by retreating upon detecting that the supervised machine learning function is generating false negatives. In general, training module 106 may train a supervised machine learning function in a manner that avoids false negatives more than avoiding false positives. Training module 106 may train the supervised machine learning function in a manner that avoids all or substantially all false negatives, because false negatives may be costlier to customers than false positives. In some examples, training module 106 may train the supervised machine learning function based on a value that specifies a proportion of false negatives to false positives, in which case the proportion may indicate a greater amount of false positives than false negatives by at least one or more orders of magnitude.

At step 306, one or more of the systems described herein may apply the supervised machine learning function to a feature vector that describes a new security incident on the set of clients to predict that the set of clients will ignore the new security incident. For example, application module 108 may, as part of server 206 in FIG. 2, apply supervised machine learning function 124 to a feature vector that describes new security incident 222 on the set of clients to predict that the set of clients will ignore new security incident 222.

As used herein, the term "new security incident" generally refers to a security incident to which the supervised machine learning function is applied after the function has been partially or fully trained at least once to thereby predict a label for the new security incident, as discussed above and further discussed below. Additionally, as used herein, the phrase "predict that the set of clients will ignore the new security incident" generally refers to the set of clients taking no action to resolve the security incident. In general, application module 108 may predict that the set of clients will simply regard the new security incident as a false positive or too trivial to address. In one embodiment, application module 108 may use any one or more of the following labels, according to any permutation, as labels indicating that the client will not take action or has not yet taken action (and may never take action): no action, false positive, defer, and/or untouched. For example, in some embodiments, system 100 may provide a list of dozens, hundreds, and/or thousands or more security incidents. In these examples, the set of clients may effectively ignore many or most of these security incidents. In some specific examples, the set of clients may effectively ignore a majority of the security incidents. The set of clients may also effectively ignore as many as 90%, 99%, or more of the security incidents, according to an arbitrary order of magnitude. Accordingly, the disclosed systems and methods may beneficially predict which security incidents the set of clients will ignore and thereby decrease the priority, or simply eliminate, one or more of the security incidents to make the list of security incidents more manageable and meaningful.

Application module 108 may apply the supervised machine learning function to the feature vector that describes the new security incident in a variety of ways. In general, after the supervised machine learning function has been partially or fully trained, at least once, the supervised machine learning function will be configured in a manner that enables the supervised machine learning function to accept a new feature vector, as input, for a corresponding new security incident, such as new security incident 222. After accepting the feature vector as input, the supervised machine learning function may be applied to thereby generate a prediction of the corresponding label as an output in accordance with the machine learning system, software, and/or algorithm. In the example of FIG. 4, supervised machine learning function 124 may predict the customer response code value for that field within the feature vector for new security incident 222.

At step 308, one or more of the systems described herein may personalize a list of security incidents that is electronically reported to the set of clients by deprioritizing the new security incident based on applying the supervised machine learning function to the feature vector that describes the new security incident. For example, personalizing module 110 may, as part of server 206 in FIG. 2, personalize list of security incidents 126 that is electronically reported to the set of clients by deprioritizing new security incident 222 based on applying supervised machine learning function 124 to the feature vector that describes new security incident 222.

As used herein, the term "list of security incidents" generally refers to a data structure, stored within computing memory, that collects or aggregates one or more security incidents in a list. Additionally, as used herein, the phrase "electronically reported to the set of clients" generally refers to transmitting one or more electronic notifications to the client, in a single notification or in a series of notifications, to notify the client about the content of the list of security incidents. The electronic notifications may be transmitted by instant message, SHORT MESSAGE SERVICE MESSAGE, email, pop-up, web-interface, automated voice message, scrolling text, network packet, and/or any other suitable form of electronic notification. Upon receiving the list of security incidents, the client machine may electronically display or output all or part of the list of security incidents in a single display or time period, or across a series of windows, interfaces, displays, and/or periods of time, in any suitable manner that effectively informs the client about the security incidents on the list of security incidents.

Personalizing module 110 may personalize the list of security incidents in a variety of ways. In general, as used herein, the phrase "deprioritize" generally refers to adjusting or configuring the list of security incidents in a manner that places less emphasis, priority, and/or content on the new security incident. For example, personalizing module 110 may simply eliminate or omit the new security incident from the list of security incidents. Similarly, personalizing module 110 may reorder the list of security incidents to move the new security incident toward a back or less conspicuous position within the list of security incidents. Additionally, or alternatively, personalizing module 110 may adjust a severity code for the new security incident to indicate that the severity code is less severe than previously. Additionally, or alternatively, personalizing module 110 may use a font or graphic for the new security incident that is less conspicuous than for another security incident, such as by using a smaller font, less screen space, a fainter or less conspicuous font, etc. Additionally, or alternatively, personalizing module may simply move the new security incident to another list of lower priority security incidents while leaving a remainder of security incidents in list of security incidents 126 (i.e., which may correspond to the primary list of security incidents in this example). In general, personalizing module 110 may take any action that renders list of security incidents 126 more accessible, readable, and/or manageable by placing less emphasis, text, screen space, priority, and/or highlighting on one or more security incidents that system 100 predicts the client will ignore or take no action on, as further discussed above.

Notably, the disclosed systems and methods may leverage insights, which are gained from machine learning on data for one client to personalize lists of security incidents for the same client or one or more different clients. More specifically, in one embodiment, the response codes were previously assigned to the security incidents within the training dataset by one client within the set of clients and the new security incident occurred on a different client within the set of clients and the list of security incidents is electronically reported to the different client. In another embodiment, the response codes were previously assigned to the security incidents within the training dataset by one client within the set of clients and the new security incident occurred on the same client within the set of clients and the personalized list of security incidents is electronically reported to the same client.

Figure 5:
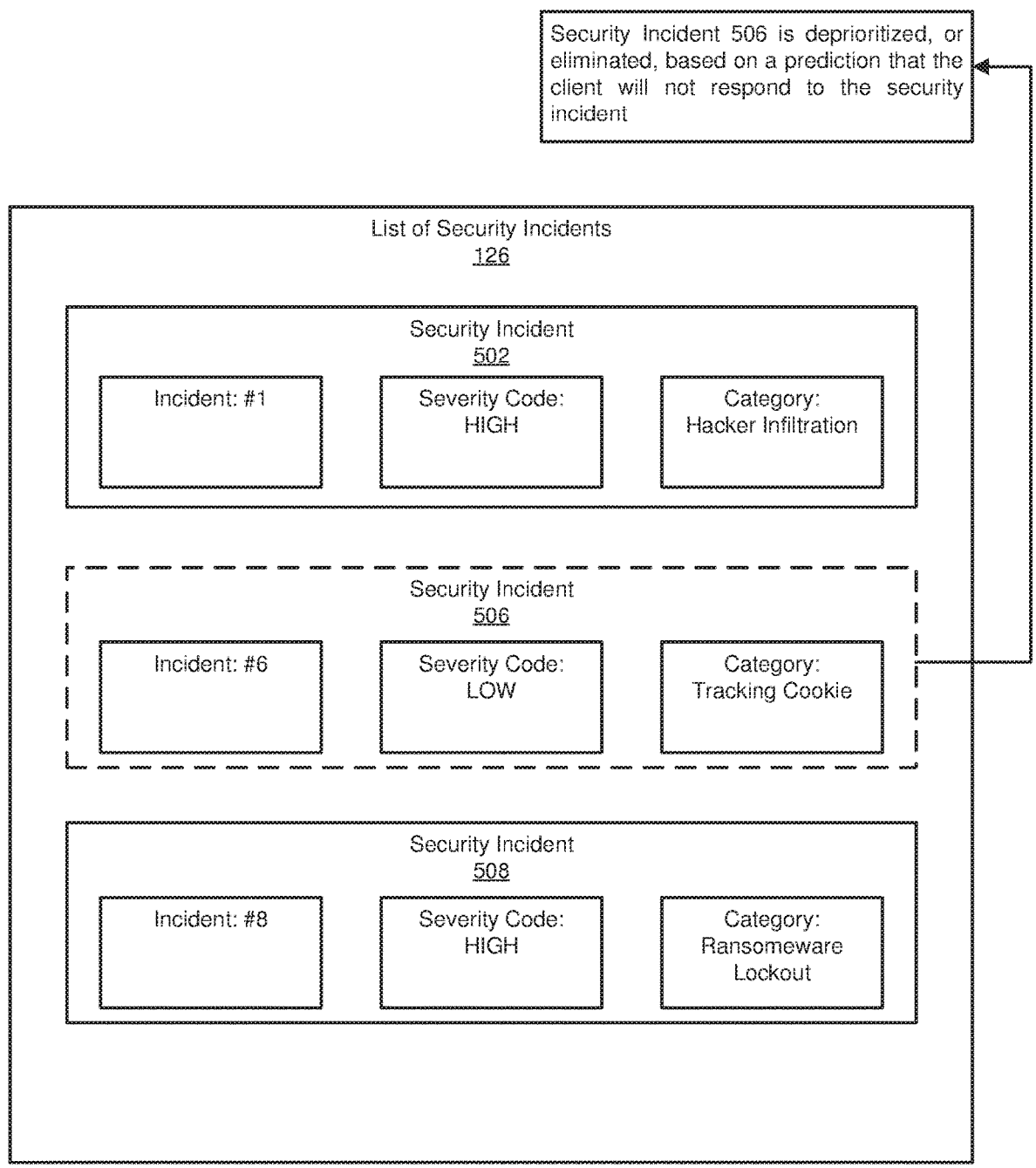
FIG. 5 is a block diagram of an example list of security incidents.

FIG. 5 shows an example of list of security incidents 126, which further includes a security incident 502, a security incident 506, and a security incident 508. Notably, security incident 506 may include the incident identifier "#6" and may therefore correspond to new security incident 222 shown in FIG. 4. As further shown in FIG. 4, new security incident 222 includes a question mark within the field for the customer response code, because the feature vector for new security incident 222 has not yet been labeled by the client. Accordingly, application module 108 may apply supervised machine learning function 124 to the feature vector that describes new security incident 222 to thereby obtain a predicted response code 404.

Returning to FIG. 5, application module 108 may predict that the client will effectively ignore security incident 506. For example, security incident 506 may correspond to a security incident that has a severity code of "LOW" because it corresponds to a simple tracking cookie that is relatively benign and also relatively common. Accordingly, because the simple tracking cookie is relatively benign, and also relatively common, clients may find it bothersome to repeatedly remove the tracking cookie and may instead simply ignore security incidents, as reported by security vendors, related to the tracking cookies. Additionally, because application module 108 predicts that the client will effectively ignore security incident 506, personalizing module 110 may decrease the priority of security incident 506 within list of security incidents 126. In one example, personalizing module 110 may simply delete, eliminate, cut, and/or omit security incident 506 from list of security incidents 126, as further shown in FIG. 5.

Additionally, in some examples, personalizing module 110 may additionally or alternatively perform a security action to protect the set of clients based on applying the supervised machine learning function to the feature vector that describes the new security incident. For example, personalizing module 110, at server 206, may perform the security action in response to predicting that the set of clients will effectively ignore the security incident. Additionally, or alternatively, personalizing module 110, at device 202, may perform a security action in response to electronically receiving the list of security incidents. In various examples, the security action may include automatically performing a script, macro, installation, de-installation, quarantining, sandboxing, and/or powering down of one or more computing resources, including a physical, hardware, software, virtual, and/or network resource, a file, drive, and/or peripheral device, etc. In other examples, the security action may include enabling, toggling, and/or heightening one or more security settings. In these examples, a security policy may specify that the security action should be performed in response to the specific security incident such that the security action and the security incident match, as specified by the security policy.

The above provides a discussion and overview of method 300 in FIG. 3. Additionally, the following discussion provides a more concrete overview of details of various embodiments of the disclosed systems and methods.

It is the job of an analyst to understand and respond to potential security incidents. In some systems, such as SYMANTEC'S MANAGED SECURITY SERVICES (MSS) setting, these incidents are generated by ingesting logs from many different security products and using heuristics and other techniques to create an incident. The incident is also labeled with a category/type, severity score and various other features to help customer analysts decide if they should respond to the given incident, or if it is not actually an issue (i.e., a configuration problem, false positive, already-cleaned malware infection, etc.). Depending on the size and goals of the company, some companies/analysts can be overwhelmed with incidents that they do not actually care about and will not resolve. In these settings, using automated approaches to curate the list of incidents is critical to provide reasonable and useful interaction with the analysts, generating more feedback, and improving the security vendor's ability to tune the client's experience.

The disclosed systems and methods may leverage machine learning techniques to responsibly prioritize and personalize incident management to help make analysts (MSS analysts working on the backend the security vendor, as well as customer analysts who respond within a company) more efficient and effective.

Ranking and prioritization are useful technologies (i.e., NETFLIX, PAGE RANK), however the consequence for an error in those settings is low. In the context of managed security services, there is an aversion to false negatives because that may mean that an attack goes unresolved. The disclosed systems and methods can also tolerate some false positives if they do not overwhelm an analyst or reinforce bad behavior. The disclosed systems and methods may learn the personalized prioritization for a customer in a responsible way, ranking events that maximize interesting incidents and minimize false negatives.

An incident may correspond to a collection of events that occur on a system that MSS believes to be suspicious. The disclosed systems and methods may extract features from incidents including: (i) the company where the incident occurred, (ii) signatures/events that occur in the incident, along with signature details/metadata, (iii) a severity code of the incident, (iv) timing information, (v) source/destination/machine information where the incident occurred/originated, and/or (vi) response code provided by customers as a known label (untouched, resolved, false positive, defer, no action). Given this information, the disclosed systems and methods generate a feature vector for each incident in the incident database, and use the response code as a label for the incident.

Given a training dataset from past data, the disclosed systems and methods may train a model to predict response codes for new incidents that arise. Various models can employ techniques that would be useful here. The following are some things to keep in mind. Because of class imbalance (e.g., most incidents are ignored), class weights are important to tune appropriately. The disclosed systems and methods may explore the class weight space using a grid search to find appropriate values to minimize the false negatives. Similarly, the disclosed systems and methods may employ stochastic gradient decent and use an objective function that quickly retreats when starting to generate false negatives.

Figure 6:
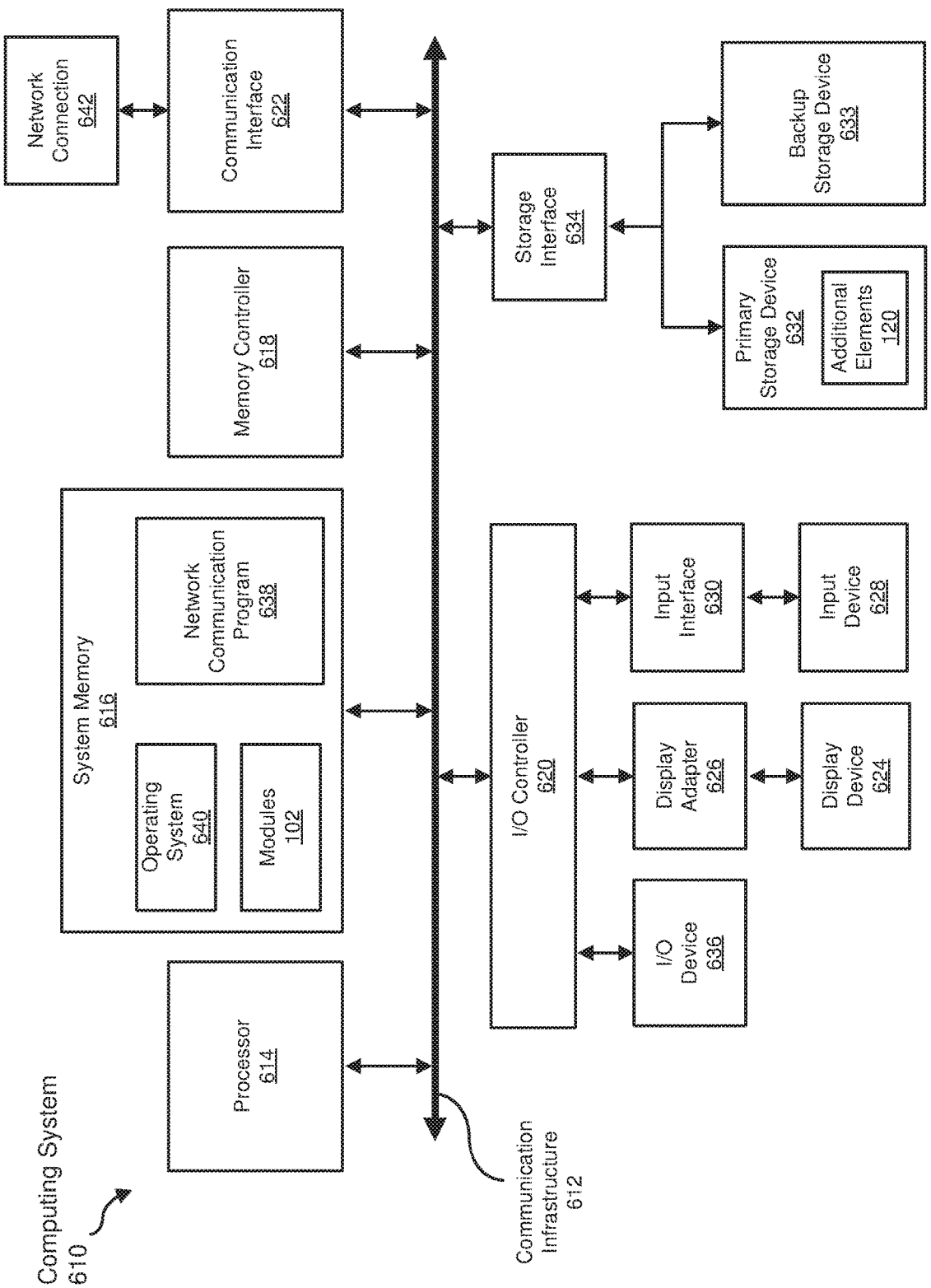
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
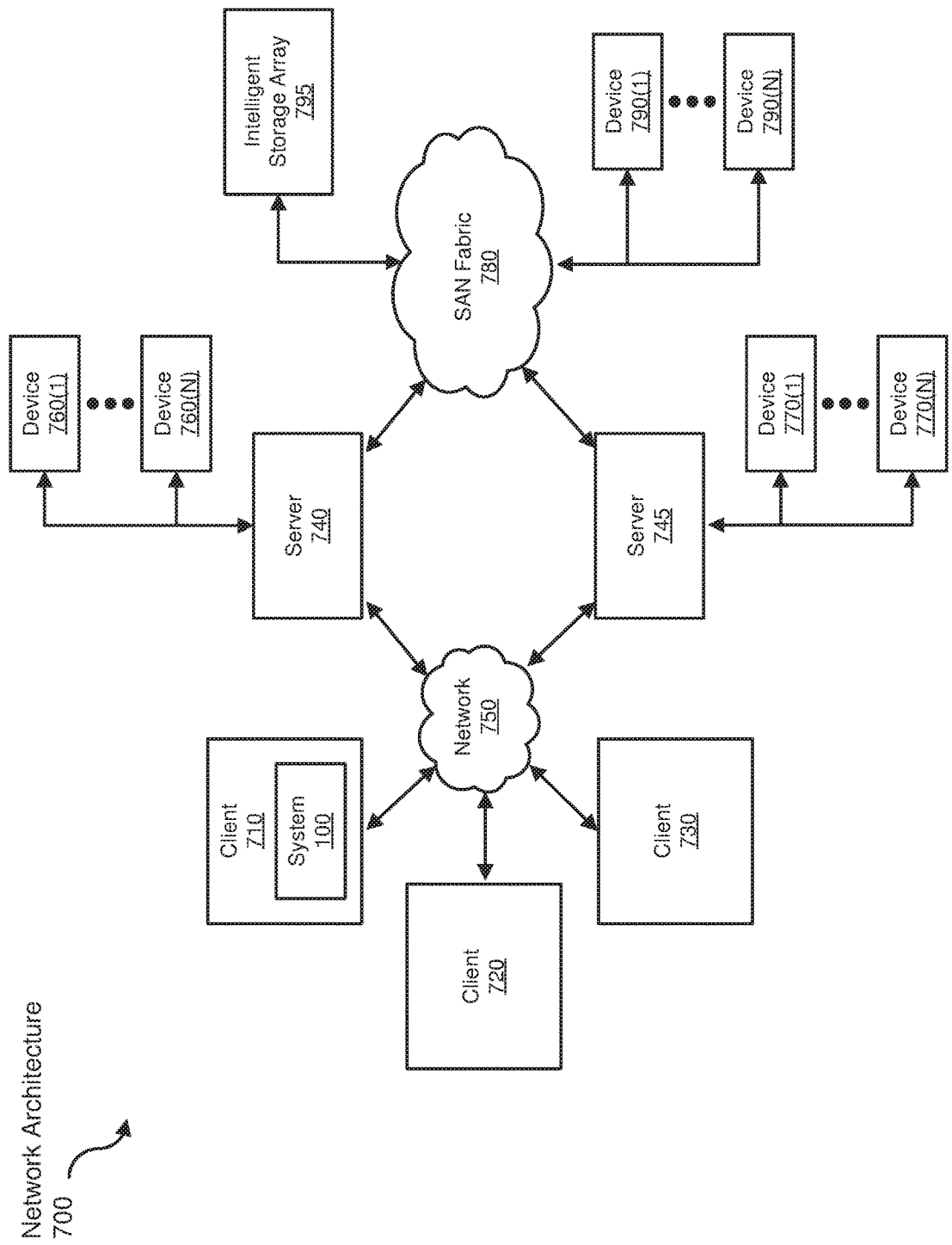
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for personalizing security incident reports.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for personalizing security incident reports, at least a portion of the method being performed by a computing device comprising at least one processor, the method comprising:
   generating, within a training dataset, a feature vector for each of a group of security incidents, the feature vector including features that describe the security incidents and the features including response codes that a set of clients assigned to the security incidents as labels;
   training a supervised machine learning function on the training dataset using the response codes that the set of clients assigned to the security incidents such that the supervised machine learning function learns how to predict an assignment of future response codes to future security incidents;
   applying the trained supervised machine learning function to a feature vector that describes a new security incident, as one of the future security incidents, on the set of clients to predict that the set of clients will ignore the new security incident; and
   personalizing a list of security incidents that is electronically reported to the set of clients by deprioritizing the new security incident based on applying the trained supervised machine learning function to the feature vector that describes the new security incident.

2. The computer-implemented method of claim 1, wherein the feature vector for each of the security incidents specifies at least two of:
   a company where the respective security incident occurred;
   at least one signature detection that triggered in correspondence to the respective security incident; and
   a severity code for the respective security incident.

3. The computer-implemented method of claim 1, wherein the feature vector for each of the security incidents specifies at least one of:
   timing information indicating a timing of the respective security incident; and
   at least one of source and destination information for a corresponding security threat.

4. The computer-implemented method of claim 1, wherein the response codes that the set of clients assigned to the security incidents as labels specify at least two of:
   no action;
   resolved;
   false positive;
   defer; and
   untouched.

5. The computer-implemented method of claim 1, wherein:
- the response codes were assigned to the security incidents within the training dataset by one client within the set of clients; and
- the new security incident occurred on a different client within the set of clients and the list of security incidents is electronically reported to the different client.

6. The computer-implemented method of claim 1, wherein:
- the response codes were assigned to the security incidents within the training dataset by one client within the set of clients; and
- the new security incident occurred on the same client within the set of clients and the personalized list of security incidents is electronically reported to the same client.

7. The computer-implemented method of claim 1, wherein deprioritizing the new security incident comprises omitting the new security incident from the list of security incidents that is electronically reported to the set of clients.

8. The computer-implemented method of claim 1, wherein training the supervised machine learning function on the training dataset using the response codes that the set of clients assigned to the security incidents comprises performing a grid search to ascertain numerical weights that minimize false negatives.

9. The computer-implemented method of claim 1, wherein training a supervised machine learning function on the training dataset using the response codes that the set of clients assigned to the security incidents comprises performing a stochastic gradient descent.

10. The computer-implemented method of claim 1, further comprising automatically performing a security action to protect the set of clients based on applying the supervised machine learning function to the feature vector that describes the new security incident.

11. A system for personalizing security incident reports, the system comprising:
- a generation module, stored in memory, that generates, within a training dataset, a feature vector for each of a group of security incidents, the feature vector including features that describe the security incidents and the features including response codes that a set of clients assigned to the security incidents as labels;
- a training module, stored in memory, that trains a supervised machine learning function on the training dataset using the response codes that the set of clients assigned to the security incidents such that the supervised machine learning function learns how to predict an assignment of future response codes to future security incidents;
- an application module, stored in memory, that applies the trained supervised machine learning function to a feature vector that describes a new security incident, as one of the future security incidents, on the set of clients to predict that the set of clients will ignore the new security incident;
- a personalizing module, stored in memory, that personalizes a list of security incidents that is electronically reported to the set of clients by deprioritizing the new security incident based on applying the trained supervised machine learning function to the new security incident; and
- at least one physical processor configured to execute the generation module, the training module, the application module, and the personalizing module.

12. The system of claim 11, wherein the feature vector for each of the security incidents specifies at least two of:
- a company where the respective security incident occurred;
- at least one signature detection that triggered in correspondence to the respective security incident; and
- a severity code for the respective security incident.

13. The system of claim 11, wherein the feature vector for each of the security incidents specifies at least one of:
- timing information indicating a timing of the respective security incident; and
- at least one of source and destination information for a corresponding security threat.

14. The system of claim 11, wherein the response codes that the set of clients assigned to the security incidents as labels specify at least two of:
- no action;
- resolved;
- false positive;
- defer; and
- untouched.

15. The system of claim 11, wherein:
- the response codes were assigned to the security incidents within the training dataset by one client within the set of clients; and
- the new security incident occurred on a different client within the set of clients and the personalizing module is configured such that the list of security incidents is electronically reported to the different client.

16. The system of claim 11, wherein:
- the response codes were assigned to the security incidents within the training dataset by one client within the set of clients; and
- the new security incident occurred on the same client within the set of clients and the personalizing module is configured such that the personalized list of security incidents is electronically reported to the same client.

17. The system of claim 11, wherein the personalizing module deprioritizes the new security incident by omitting the new security incident from the list of security incidents that is electronically reported to the set of clients.

18. The system of claim 11, wherein the training module trains the supervised machine learning function on the training dataset using the response codes that the set of clients assigned to the security incidents by performing a grid search to ascertain numerical weights that minimize false negatives.

19. The system of claim 11, wherein the training module trains a supervised machine learning function on the training dataset using the response codes that the set of clients assigned to the security incidents by performing a stochastic gradient descent.

20. A non-transitory computer-readable medium comprising one or more computer-readable instructions that, when executed by at least one processor of a computing device, cause the computing device to:
- generate, within a training dataset, a feature vector for each of a group of security incidents, the feature vector including features that describe the security incidents and the features including response codes that a set of clients assigned to the security incidents as labels;
- train a supervised machine learning function on the training dataset using the response codes that the set of clients assigned to the security incidents such that the supervised machine learning function learns how to predict an assignment of future response codes to future security incidents;

apply the trained supervised machine learning function to a feature vector that describes a new security incident, as one of the future security incidents, on the set of clients to predict that the set of clients will ignore the new security incident; and personalize a list of security incidents that is electronically reported to the set of clients by deprioritizing the new security incident based on applying the trained supervised machine learning function to the feature vector that describes the new security incident.

* * * * *